(12) United States Patent
Nelson et al.

(10) Patent No.: US 8,127,151 B2
(45) Date of Patent: Feb. 28, 2012

(54) HARDWARE-BASED KEY GENERATION AND RECOVERY

(75) Inventors: Patrick A. Nelson, Orlando, FL (US); Christian Adams, Yalaha, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 317 days.

(21) Appl. No.: 12/578,089

(22) Filed: Oct. 13, 2009

(65) Prior Publication Data

US 2011/0087897 A1    Apr. 14, 2011

(51) Int. Cl.
  H04L 9/32    (2006.01)
  G06F 11/30   (2006.01)
  G06F 11/00   (2006.01)

(52) U.S. Cl. ........ 713/193; 713/189; 713/190; 713/191; 713/192; 713/194; 726/34; 726/35; 726/36

(58) Field of Classification Search .................... 713/193
See application file for complete search history.

(56) References Cited

U.S. PATENT DOCUMENTS

| 7,116,111 | B2  | 10/2006 | Wyar |
| 7,509,494 | B2* | 3/2009  | Al-Ali ............................ 713/168 |
| 2002/0152392 | A1 | 10/2002 | Hardy et al. |
| 2004/0015309 | A1 | 1/2004 | Swisher et al. |
| 2004/0247316 | A1 | 12/2004 | Soto et al. |
| 2005/0198271 | A1 | 9/2005 | Rubinstein |
| 2006/0182169 | A1 | 8/2006 | Belge et al. |
| 2006/0242696 | A1* | 10/2006 | Cruzado et al. ................. 726/16 |
| 2008/0025229 | A1 | 1/2008 | Beliles et al. |
| 2009/0228951 | A1 | 9/2009 | Ramesh et al. |

FOREIGN PATENT DOCUMENTS

| DE | 29612698      | 9/1996 |
| EP |   829729 A1   | 3/1998 |
| WO | WO-2007048226 A1 | 5/2007 |

OTHER PUBLICATIONS

RD-434148 A "Test process for fully assembled high density cards and also for raw cards during detection of faults on interconnecting nets".

* cited by examiner

Primary Examiner — Longbit Chai
(74) Attorney, Agent, or Firm — Birch, Stewart, Kolasch & Birch, LLP

(57) ABSTRACT

A system and method of recovering encoded information contained in a device by storing and retrieving at least part of the necessary decoding data by setting and measuring the physical characteristics of the device. Storage and recovery options include, but are not limited to, measurement of electronic or optical characteristics of electrically or optically conductive portions of the device using a range of measurement techniques that include, but are not limited to, time-domain reflectometry.

50 Claims, 11 Drawing Sheets

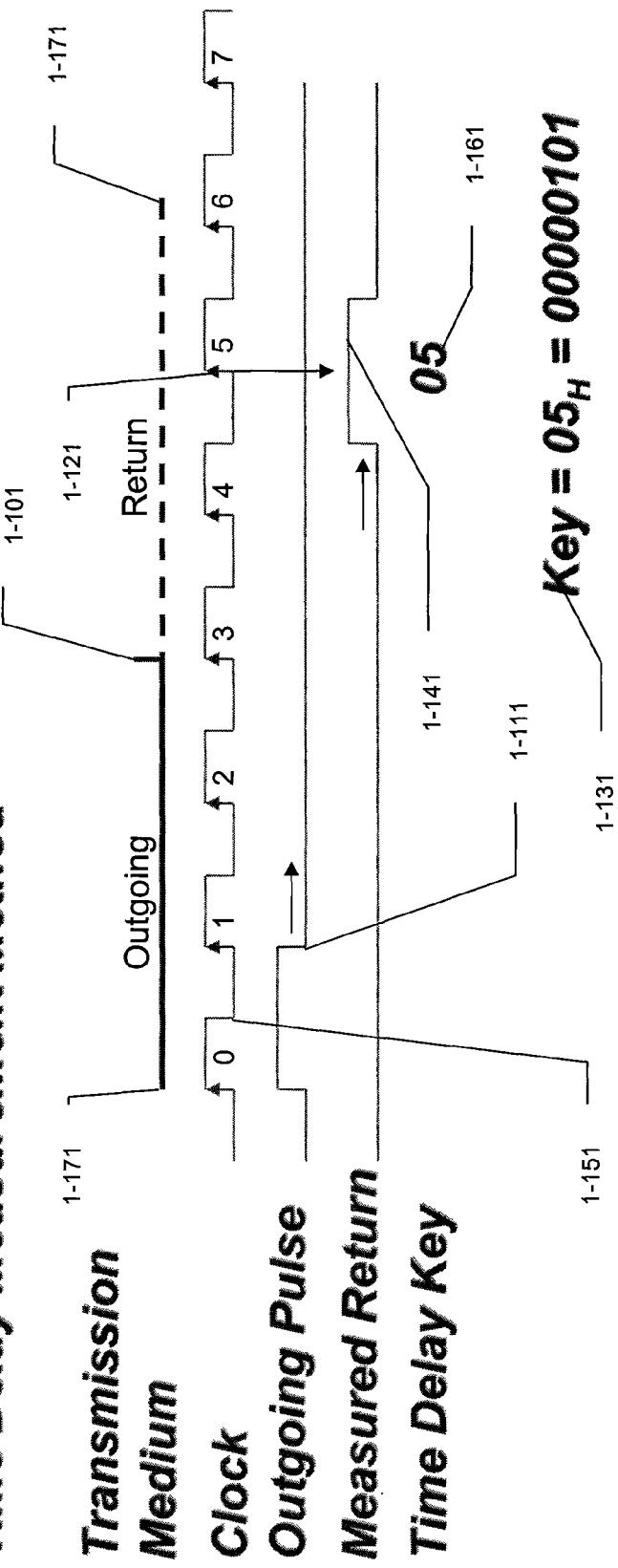

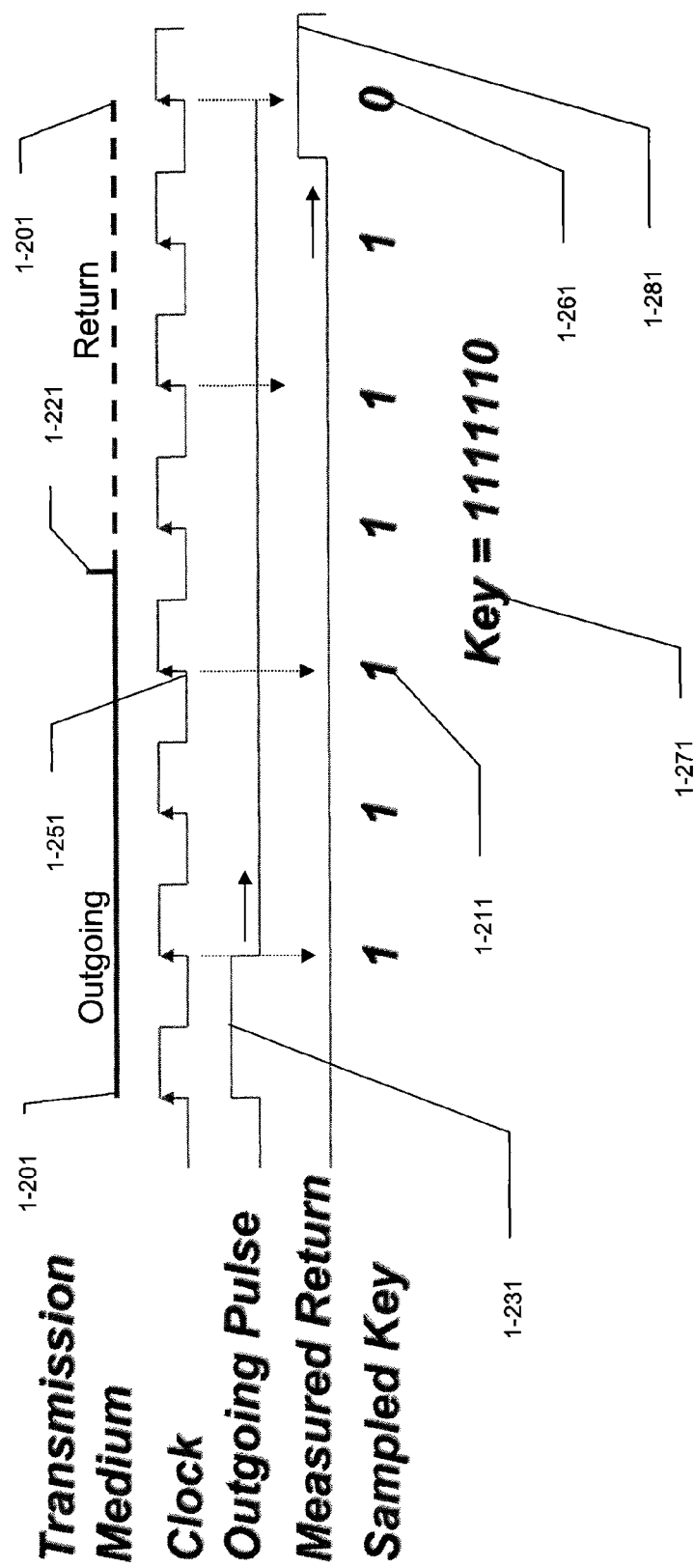

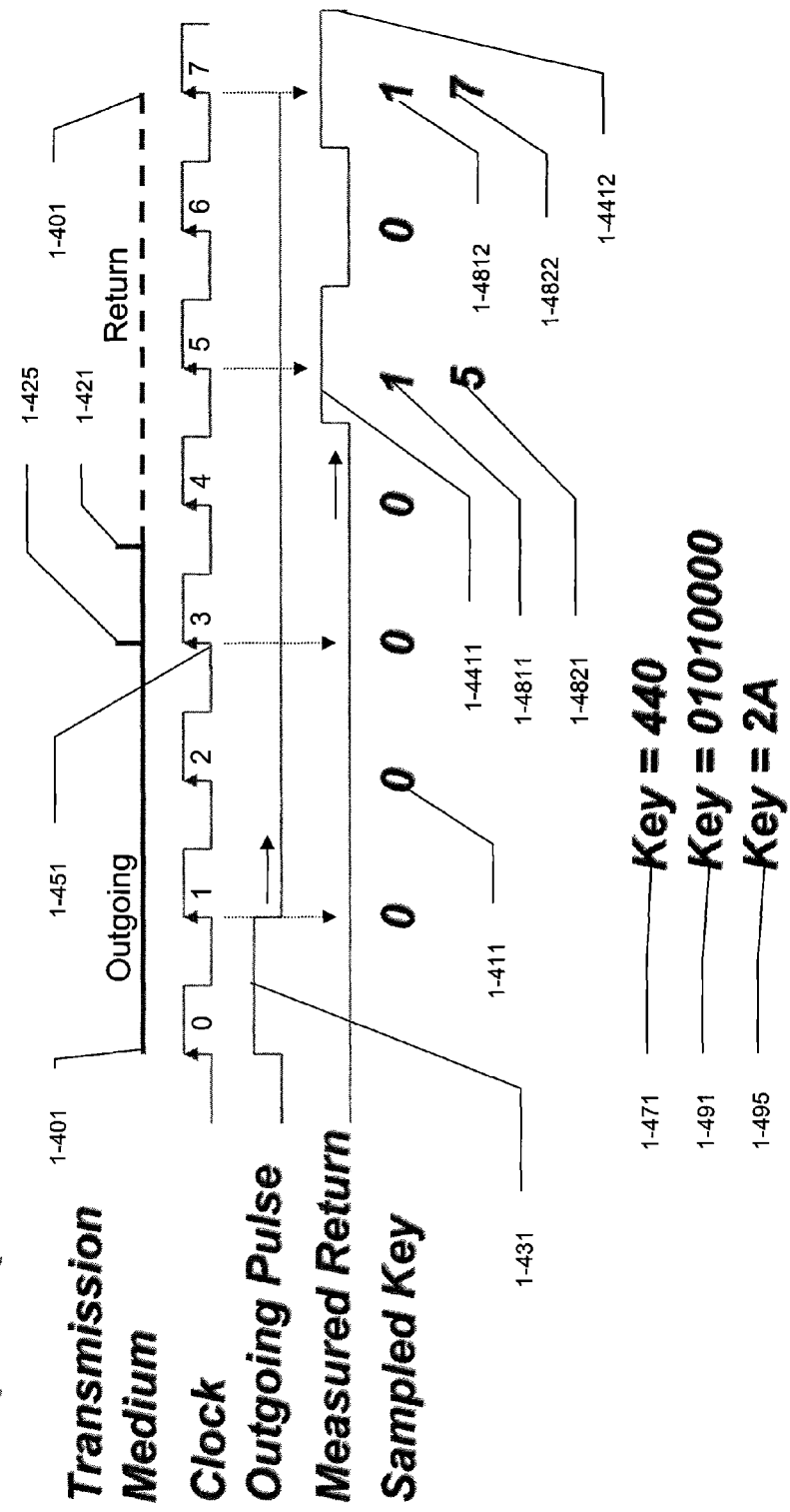

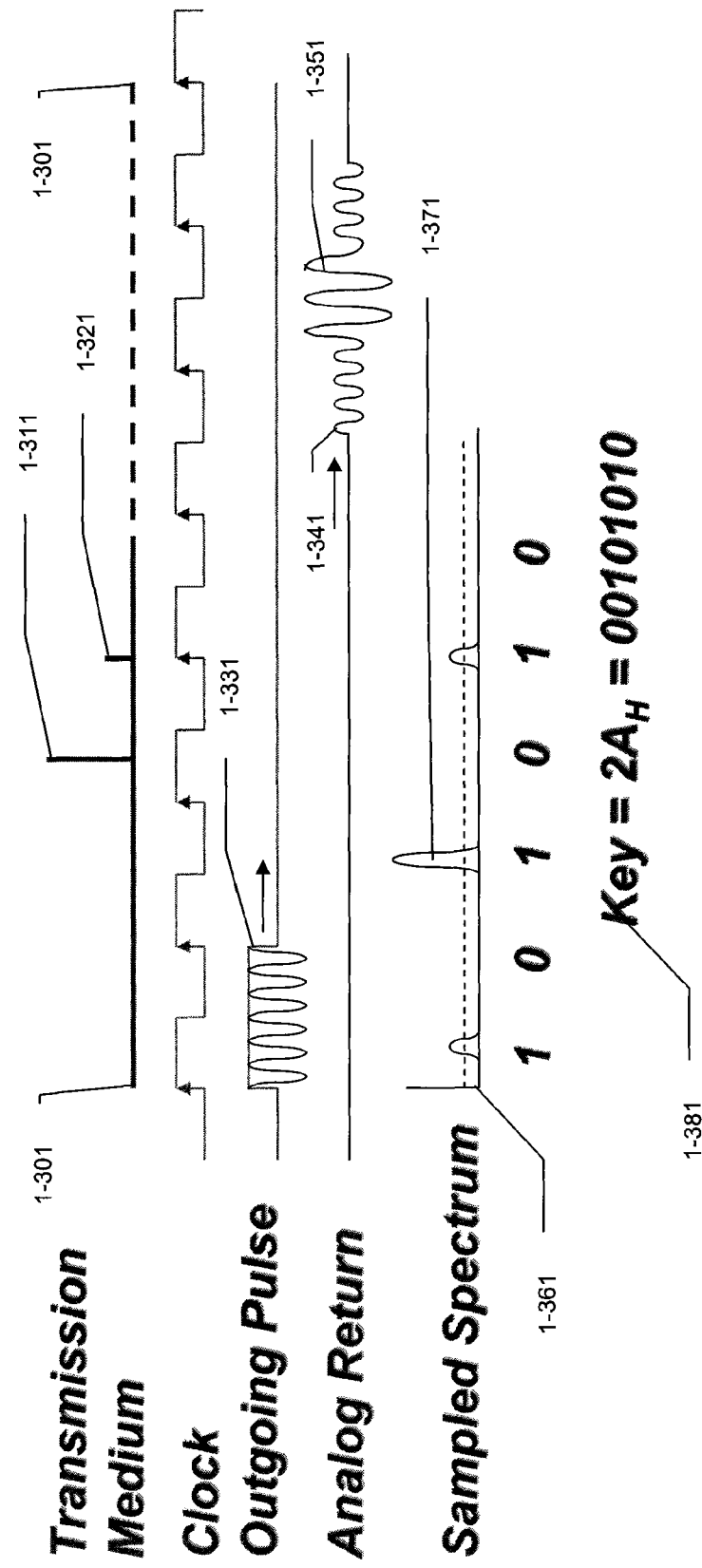

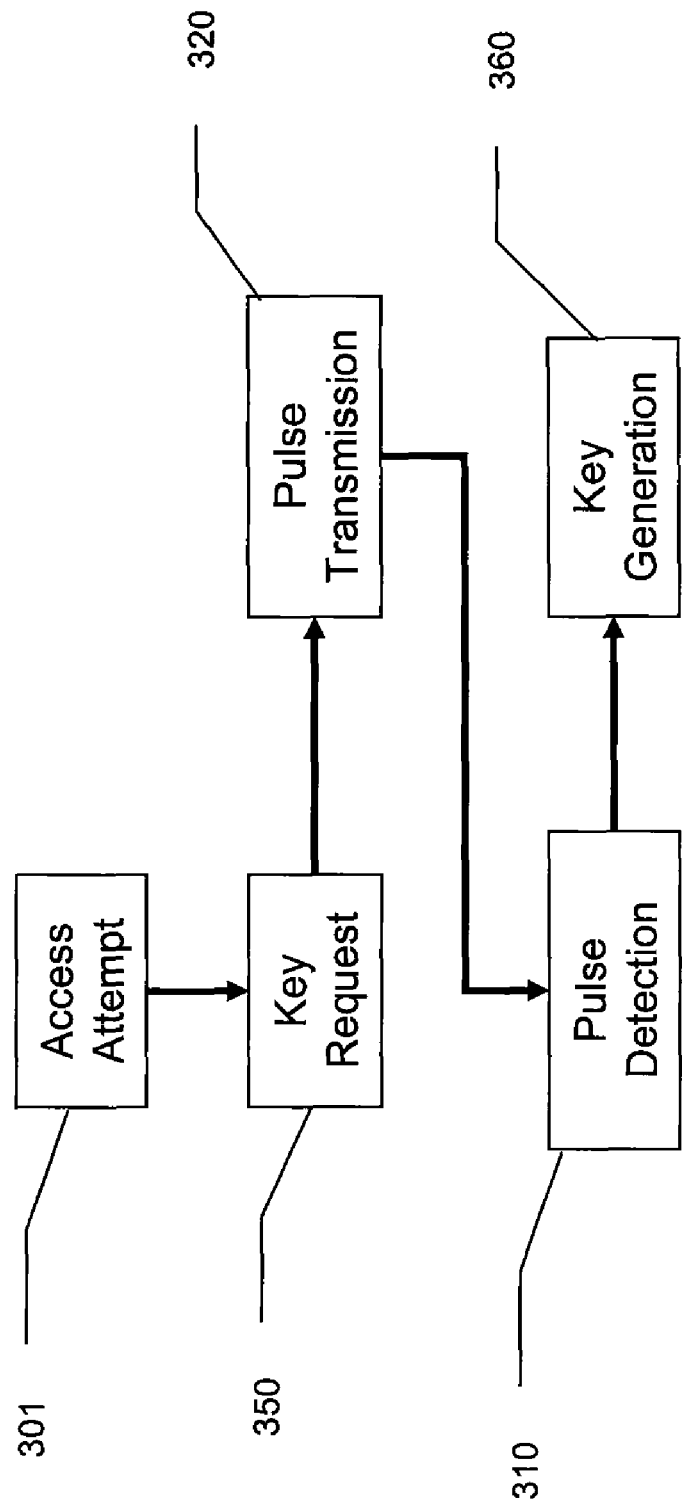

HARDWARE-BASED KEY GENERATION AND RECOVERY

TECHNICAL FIELD OF THE INVENTION

The present invention relates in general to hardware-based anti-tamper solutions to prevent unauthorized data access, and specifically to the generation, storage, and recovery of encryption or authentication key data using detectable physical parameters of the protected device or system.

BACKGROUND OF THE INVENTION

Anti-tamper (AT) devices and techniques have long been used to protect and secure proprietary and secret products and information from discovery by either hacking or reverse engineering. AT techniques and reverse engineering techniques constantly develop in response to each other in an ever more complex and intricate interplay of security measures and counter-measures. One particular area where stronger anti-tamper techniques are desirable is in the development of proprietary logic and wiring architectures or hardware-based algorithms.

Another area of interest related to anti-tamper techniques is the encryption of information. Encrypting software or operating parameters or other data in a static state is desirable for securing information and preventing tamper on systems that may be composed of standard or "off the shelf" components.

One of the principal difficulties, especially related to information encryption, is concealing the locations of stored encryption and decryption keys, thereby making it more difficult to unlock and reverse engineer an information storage or information processing system.

SUMMARY OF THE INVENTION

An embodiment of the present invention provides a system and method for concealing encryption, decryption, and access key information in hardware components that may not be typically used for data storage. Specifically, aspects of the present invention uses the results of hardware-based internal measurement and analysis techniques such as time-domain reflectometry (TDR) within a system as key values. Such techniques may ensure that changes to the system hardware render the data stored on the system, or the system itself, partially or fully inaccessible or inoperable. Embodiments of the present invention also make creating an imitation system more difficult by requiring that all the physical characteristics related to analysis and testing of the conducting media and the code generation algorithm be identical to the "authentic" system.

Embodiments of the present invention may be directed to applications where hardware systems are constantly powered on, or ones that are only activated intermittently or rarely. In a constant power-on environment the system may perform a test or check on a particular schedule or after a certain time period since being powered on or since the last check to make sure nothing has been altered. In embodiments that are not activated constantly or regularly, the check may be performed each time the system is activated or may be built into the power-on sequence itself such that any changes to the hardware will cause the check to fail and prevent the system from powering on or fully activating.

Yet further embodiments may be directed at authentication systems instead of data encryption or tamper protection. In authentication systems the test or check may generate a key that then authenticates or permits subsequent hardware or software access or activation.

Embodiments of the present invention may employ any hardware component in a system as a basis for analysis, including wiring or configurations in mezzanine cards, power supplies, processor architectures, or any other electrically active component. Other embodiments of the present invention may employ any electrically responsive component, such as conductive portions of a casing, in addition to or instead of electrically active components. Yet further embodiments of the present invention may replace or supplement electrical conduction test results with detection of light reflections, acoustical information from ultrasonic test devices, internal or ambient temperature information, vibration detection, and any other measureable physical characteristic or combination of characteristics whose detection and quantification can be built into a device according to the present invention.

In one embodiment of the present invention, keys may be "stored" in cables that have a short at one end. The key in such an instance would depend on the voltage pulse propagated down the cable, the nature of the cable itself, and the length of the cable. The key would, in this particular embodiment, be related to the time required for an opposing reflection of a voltage pulse to reach the pulse launch point, dropping the launch point voltage to zero, or to some other predefined threshold value.

Other embodiments of the present invention may relate other characteristics of a cable or other conductor in a system and their associated electrical responses. Alternate inventive embodiments may use any number of other electrical components for key generation, such as the characteristics of inductive or capacitive couplings, or any other mechanism or device that may change the characteristics of a propagated signal and generate a return pulse or other usable signal echo or response. For detection purposes, spectral analysis, analog frequency analysis, or pulse models may be employed. One preferred detection method in some embodiments may be the analog measurement of an entire signal stream. Signal detection or measurement may be characterized in various embodiments in either the time or the frequency domains.

Yet other embodiments of the present invention may employ non-electrical signal propagation and reflection detection in addition to, or instead of, electrical signal testing techniques for code or key generation from measureable physical parameters. Such embodiments may use ultrasonic devices and measure echoes received based on the internal contours and composition of a casing, fiber-optic test devices to look for spectrum-specific signal reflections in fiber channels, ambient temperature measurements as seed values for variable codes or key, or any other similar devices that determine physical characteristics of the device or its environment.

Changes in the spectral domain of a return signal may be caused by any partial short, impedance differential, or passive coupling, or even by changes in the dielectric materials that certain circuit-board components may reside on. Such effects can be either static or dynamic, resulting in additional sources of complexity for the key generation capability. Different chip or board substrates or wire claddings may all change the nature of the return signal spectrum and are therefore suitable for use a code-bearing elements in differing embodiments of the present invention. Embodiments of the present invention may, however, be subject to unwanted changes in signal propagation characteristics due to changing environmental conditions such as temperature or pressure variations or minor damage due to nicks in wires or wire cladding. Embodiments of the present invention may be designed so that a certain range of responses, based on an expected range of operating tolerances, may all be associated with valid codes or authentication values to allow for use or access of a device. Such embodiments may still ensure that changes to the cables, conductors, or their operating environment removes key information, thereby restricting information access or system operability, while at the same time making allowances for harsh or unpredictable operating conditions.

Yet other embodiments of the present invention may be designed around the concept of a constantly changing environment such that each time the length, composition, construction, or working environment of a cable or other conductor changes, the system generates and propagates a completely new set of key data, thereby rendering any previously acquired key information obsolete and unusable.

Further embodiments of the present invention may include purely hardware based access devices, and may combine such access device with other anti-tamper measures so that the shape and composition of any wires or cables in such an access device will be changed in an unrecoverable fashion should the device be opened for examination. Yet further embodiments of such devices may include mechanical, magnetic, or programmable components that allow for changes in the length or operating environment of the analyzed conductors contained therein. Some such embodiments may contain large or small chemical devices that physically destroy or alter circuitry or memory components when triggered, other embodiments may employ techniques such as causing a magnetic component of the device to pass over a memory component of the device if the device casing is opened, thereby wiping the memory component. Yet further embodiments may employ a broad range of tamper-proofing techniques in conjunction with the code generation aspect of the present invention to ensure that part or all of the measurand is altered or destroyed as a result of the tampering, thereby preventing the re-generation of the required access or authentication codes.

Other embodiments of the present invention may be employed for secure communications networks by encoding and de-coding data transmitted between a central server and end terminals or users according to analysis results for each end terminal, thereby eliminating the need to transmit any key information with the encoded data and making the data much more difficult to intercept and decode from the transmission line. Such embodiments may employ symmetric key encoding, but alternate embodiments may also make use of asymmetrical key systems that may include random authentication keys generated from local variables such as changes in temperature or variations in distance between a terminal and a server. Yet other embodiments of the present invention may use keys generated from an analysis to generate yet further keys or further key information.

Embodiments of the present invention may include an apparatus that recovers encoded information stored in a data storage device. Embodiments of such an apparatus may comprise at least one signal conductor with predetermined transmission characteristics; an encoded information storage portion having at least one input/output (i/o) interface; a system clock; an access detection portion that detects an attempt to read at least a portion of encoded information stored in the encoded information storage portion; a transmitter that transmits, at a pulse transmission location, at least one pulse along the signal conductor; a detector that determines transmission characteristics of the signal conductor by detecting, at a detection location, a return signal propagated along the conductor as a result of the pulse transmission; and a key generator that generates a decoding key based on the detected transmission characteristics; where the transmission location and detection location define a signal path along the conductor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF DRAWINGS

The present invention will become more fully understood from the detailed description given hereinbelow and the accompanying drawings which are given by way of illustration only, and thus are not limitative of the present invention, and wherein:

FIG. 1a shows a time delay measurement method for measuring the return of a pulse according to aspects of the present invention;

FIG. 1b shows a sampled key method for measuring the return of a pulse according to aspects of the present invention;

FIG. 1c shows a multiple discontinuity method for measuring the return of a pulse according to aspects of the present invention;

FIG. 1d shows a spectral analysis method for measuring the return of a pulse according to aspects of the present invention;

FIG. 3a. shows a block diagram of an embodiment of a hardware-based key generation process according to aspects of the present invention;

Figure 2A:
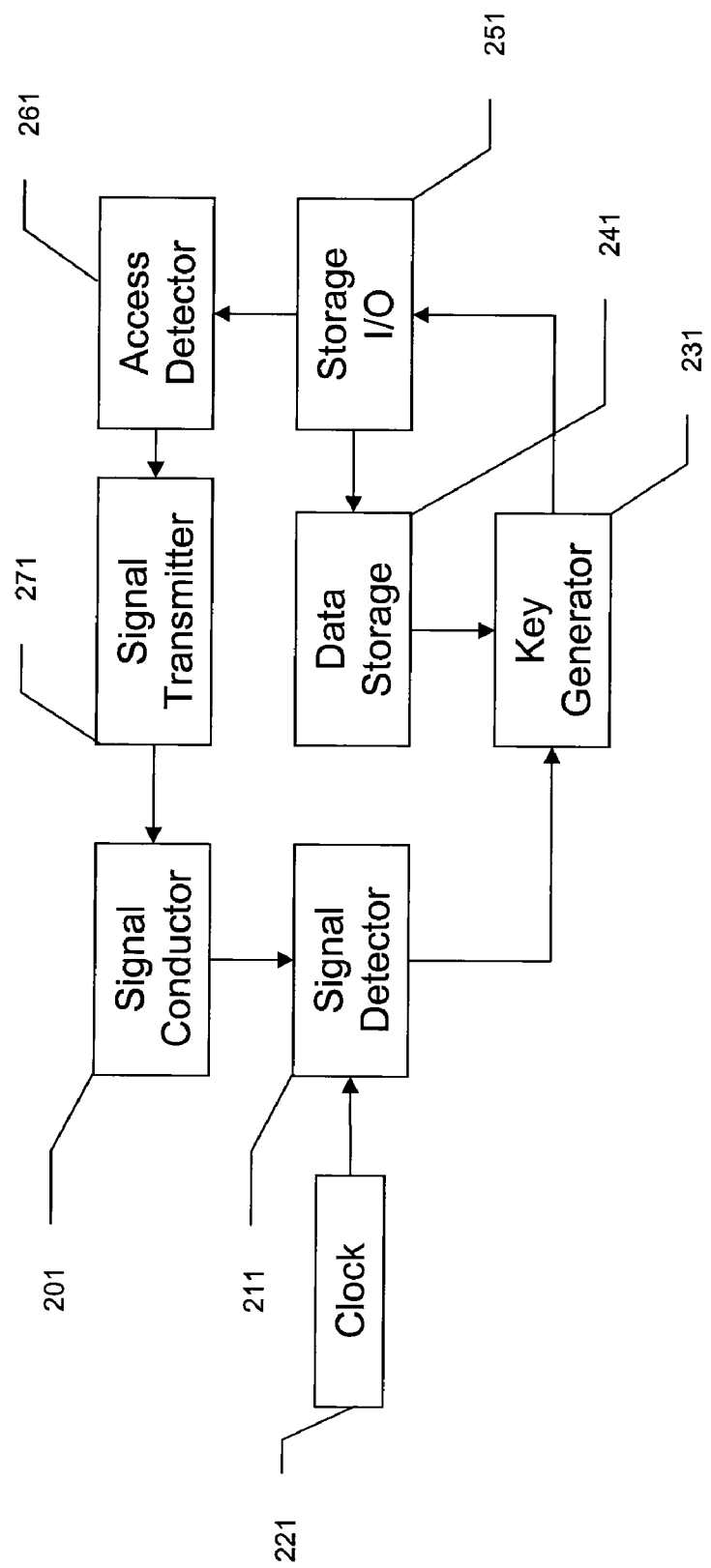
FIG. 2a shows a block diagram of an embodiment of a hardware system configured for hardware-based key access according to aspects of the present invention.

The drawings will be described in detail in the course of the detailed description of the invention.

DETAILED DESCRIPTION

Embodiments of the present invention include a system and method for embedding access or encryption keys, or portions thereof, directly into system hardware components such that the keys may only be recovered or generated by an internal test or analysis technique (such as, for instance, Time Domain Reflectometry), thereby severely restricting the ability of unauthorized users to access a protected system or data set.

Time Domain Reflectometry (TDR) uses short circuits, open circuits, and discontinuities or changes in the impedance of conductors to determine certain characteristics of the conductor based on an assumption about or knowledge of the signal propagation speed of the conductor. Other analysis techniques may use signal propagation time or a comparison of a return signal against a known or expected set of modifications based on a particular signal path and/or signal-altering elements in a signal path.

In a secure or encrypted system that is composed of programmed or programmable hardware components, an understanding or awareness of the characteristics of the hardware components allows for the embedding of access and encryption key data directly into a circuit design. Such an approach may completely conceal the existence of an access control system while simultaneously restricting system access or rendering any data or software removed or copied from the system unusable.

FIG. 1a shows a conceptual embodiment of signal analysis-based key generation with a time-delay measurement method. In this embodiment, a transmission medium defines a conduction path with a starting point 1-171 and an ending point 1-101. The ending point may be the termination point of a wire, an electrical element such as capacitor or a resistor, a change in conductive materials, such as a transition from gold to copper, a change in dielectric materials in a printed circuit board, or any other source of impedance variation. A pulse 1-111 originating from the starting point 1-171 proceeds along the transmission medium until it encounters the impedance change at the ending point 1-101, whereupon at least a portion of the pulse 1-111 is reflected as a return pulse 1-141 that travels back along the transmission medium (shown as dashed portion) to the starting point 1-171.

This TDR-type pulse transmission and return detection process may be done with or without a system clock. In the embodiment shown, an outgoing pulse 1-111 is transmitted at an initial clock cycle 1-151. The return pulse 1-141 is detected at some subsequent clock cycle 1-121. In this embodiment, depicted in the time domain, the return pulse 1-141 has a one-half clock cycle offset from the outgoing pulse, indicating that it 180 degrees out of phase from the outgoing pulse 1-111. The half cycle clock offset depicted here is merely coincident and particular to the embodiment shown. The time when a pulse returns may depend on a variety of factors including the length of the medium (distance of the break from the receiver). Embodiments having a longer conduction medium may shift the pulse out a little longer in time. A receiver sampler disposed in an embodiment as discussed above may sample a return pulse wherever it occurs. In some embodiments, a clock signal may be generated and employed starting from pulse transmission. In some embodiments, there may be a waiting period of a fixed or adjustable number of clock cycles after transmission before detection processes are initiated. In other embodiments, detection may proceed for a fixed or otherwise pre-set number of clock cycles. In yet further embodiments, there may be no clock signal used and instead only one or more transmission operations followed by one or more detection operations.

In the embodiment shown, the return pulse 1-141 is detected during the fifth clock cycle 1-121 in this example. A code generation portion (not shown) may, for embodiments associated with a system clock or other timing component, associate the clock cycle value 1-161 to the pulse detection. A time-delay key 1-131 may be created from this assigned value by something as simple as generating a binary number having the assigned detection value. Other embodiments may employ more complicated key generation methods or may take entirely different approaches to interpreting the received pulse data. Yet further embodiments of the present invention may use an initial pulse as a clock or timer for determining the echo delay of subsequent TDR pulses.

In some embodiments, an initial number may be generated according to a wide range of methods and then converted to a key. In some embodiments, the initial number may be generated by counting return pulse level or voltage transitions (low to high or high to low, or both) in more complicated waveforms. Yet further embodiments may measure pulse width, count peaks, measure amplitude, and/or perform spectral analysis of a return waveform. In some embodiments, the initial number may be subjected to a subsequent encoding or scrambling scheme to create a key (another number).

FIG. 1b shows a conceptual embodiment of a key generation process according to the present invention with a sampled key method. In embodiments of the type depicted, transmission medium defined by a conduction path with a starting point 1-201 and an ending point 1-221 may include any of the configurations or alternatives described with respect to the time-delay measurement embodiments. An initial outgoing pulse 1-231 originating from the starting point 1-201 proceeds along the transmission medium until it encounters an impedance change at the ending point 1-221, where at least a portion of the pulse 1-231 is reflected as a return pulse 1-281 that travels back along the transmission medium (shown as dashed portion) to the starting point 1-201.

As in a time-delay measurement embodiment, the pulse transmission and return process is all done in conjunction with a clock. In embodiments of the pulse detection method depicted, a clock may count a predetermined number of cycles, starting with the emission of the outgoing pulse 1-231. Some embodiments may use an offset to account for phase differences between the reflection 1-281 and the outgoing pulse 1-231

Unlike the time-delay embodiments, the sampled key method does not require that the individual clock pulses be assigned a counting value. In this embodiment, each of the predetermined number of clock cycles 1-251 is regarded as a bit 1-211. If a return pulse 1-281 is detected during a clock cycle, the bit associated with that cycle may be set to "0" 1-261 whereas a clock cycle with no return pulse may have a bit value of "1" 1-211. The resultant key value 1-271, in the embodiment depicted, is a binary number of a predetermined bit length whose value is determined by the location of an impedance discontinuity along a common conduction path. This key value may be used as a key in and of itself, may be used as a seed value to generate subsequent keys, or may be part of many keys generated by multiple and possibly different TDR measurement methods within a larger system.

Alternate embodiments of the present invention may employ a different clock synchronization scheme, such as using a first return pulse to establish a number of sampling cycles or alternating leading-edge and trailing-edge pulse detection techniques on different detection cycles. Yet further alternative embodiments may include complex conduction paths with multiple discontinuities or other structures such as loops, induction coils, capacitors, transitions between insulated wire conductors and printed circuit board pathways, and multiple other structures that may generate full or partial return pulses in response to an outgoing test pulse.

In some sampling-based embodiments, each clock cycle may have a value associated with a leading or trailing edge detection and/or a value associated with no detection such that a numerical sequence may be generated directly by sampling a return signal, with the length of the sequence determined by the number of clock cycles during which sampling proceeds. In some embodiments, the numerical sequence may be a binary number where each bit represents a clock cycle and has a value assigned to it based on particular characteristics of a response signal sampled during that clock cycle. In some embodiments, those characteristics may include signal attributes associated with a particular number or type of termination points, impedance discontinuities, or electrical elements located along the conduction path. In yet further embodiments, the characteristics may also include indicators of the relative locations of those termination points, impedance discontinuities, or electrical elements along the conduction path.

Some embodiments may use pulse detection techniques unrelated to TDR. Embodiments having a transmitter and a detector at opposite ends of a signal conduction path may transmit and detect without employing TDR-based analysis or measurement principles. Such embodiments may simply detect a transmission time along a conductor to verify conductor length, detect signal intensity at the end of the signal path to determine likely conductor composition, or may detect a signal that is expected to pass through certain signal-altering components (such as active or passive electrical components, lenses, filters, reflectors, and/or sound dampeners).

Yet further embodiments may employ alternate counting schemes, such as a base 3 system where detection of a leading-edge pulse or a trailing edge pulse in a time-slot or counting slot associated with a digit assigns a value of "1" whereas detection of both a leading edge and trailing edge (i.e. detecting a complete echo) in that same slot assigns a value of "2." Further embodiments may employ relative counting schemes that do not involve using a clock but instead merely detect particular events associated with part or all of a return signal detection process. Such embodiments may include detection of an overall voltage level of a voltage pulse or an intensity level of an optical or ultrasonic pulse.

Both time-delay and sampled key methods may be applied to scenarios where a transmission medium has multiple discontinuities, as shown in FIG. 1c. In the embodiment shown, the transmission medium has a starting point 1-401 and two ending points 1-425, 1-421, each one representing an impedance discontinuity. These ending points may be branched or sequential and may represent impedance variations in a common conduction path, electrical elements connected to wires, transitions between integrated circuit and printed wiring board conduction pathways, lead attachment points, wire termination points, or any other configuration that may result in multiple TDR reflections.

In the embodiment shown, the TDR test pulse 1-431 propagates from the origination point 1-401 to the end points 1-451, 1-425. Both TDR reflections 1-4411, 1-4412, in such an embodiment, would return to the origination point 1-401 along propagation path of the transmission medium (shown here as a dashed line). Detection of the return pulses 1-4411, 1-4412 may be counted or sampled according to a clock signal 1-451. In the sampling embodiment depicted, clock cycles with no return pulse detected are assigned a value of "0" 1-411 and clock cycles with a return pulse are assigned a value of "1" 1-4811, 1-4812. Alternate sampling embodiments may use different value assignment schemes, or may employ multiple value assignment schemes that alternate between clock cycles, or any other applicable return sampling and value assignment protocol. In the time-delay embodiment depicted, each detected return pulse 1-4411, 1-4412 is assigned a number value 1-4821, 1-4822 associated with the particular clock pulse during which the return pulse was detected. Alternate counting-based embodiments may assign number values from different counting systems, such as hexadecimal, or may vary value assignment schemes based on the particular numerical properties of a counted clock pulse, such as doubling the value of all pulses detected on even clock cycles or using a form of modulo arithmetic to assign values to pulses detected on prime-numbered clock cycles.

The keys generated by these methods 1-471, 1-491, 1-495 may also be subject to a wide range of embodiments and variations on the particular key generation algorithms used. Generated keys may be binary 1-491, hexadecimal, 1-495, or more exotic such as base-5 values 1-471. In the embodiment depicted, the hexadecimal key value 1-495 is generated by the formula Key=R2!/R1!, where R2 is the second return pulse value 1-4822 and R1 is the first return pulse value 1-4821. The relationship between the sampled or counted return pulses, the assigned values, and the generated keys is limited only by the capabilities of available code or key generation algorithms or formulas.

Other alternate embodiments may include additional schemes to generate return keys or return key sets based on multiple output pulses along the same conduction pathways. In some embodiments, multiple pulses may be transmitted. An embodiment may include multiple voltage pulses of differing widths and/or intensities such that either the separate or combined return or response signals resulting from those pulses may be detected. Yet further embodiments may employ multiple pulses transmitted at differing intervals, such that the interval between a first and a second pulse may be different from an interval between the second and third pulses. Such embodiments may mix strong and weak voltage pulses, or may send modulated 'tones' of voltage at certain frequencies. An embodiment of a modulated tone transmission and detection method is depicted in FIG. 1d.

In an embodiment of a complex spectral detection method shown in FIG. 1d, a conduction path in a transmission medium may have multiple discontinuities of varying severity or intensity 1-311, 1-321. Just as in the time-delay and sampled method embodiments, the conduction path is defined by a starting point 1-301 and ending points 1-311, 1-321. As in the previously depicted embodiments, the return path from the ending points back to the starting point is shown as the dashed portion of the transmission medium depiction.

The embodiment depicted has multiple ending points indicating the multiple discontinuities of the depicted embodiment. Each impedance discontinuity is described as an ending point because it generates at least a partial reflection of the outgoing pulse 1-331. Such discontinuities may be caused by multiple electronic components along a common wire, or by a transition from an insulated wire to a conduction pathway on a printed circuit board, or by changes in dielectric materials along a conduction pathway, or any combination of such configurations such as, for example, a resistor embedded into a printed wiring board. Such a configuration may reflect a first impedance change between the printed conduction path and the wire lead going to the resistor, and a second impedance change between the wire lead and the resistor itself.

Other embodiments may have multiple impedance discontinuities along a common transmission medium, such as two wire leads coming off a single conduction pathway. Both lead attachment points represent separate impedance discontinuities occurring sequentially on a common conduction pathway in such an embodiment. Further embodiments still may have a conduction pathway that branches or splits, with branches having termination points or other impedance discontinuities that may or may not be similar, either in distance from an origination point or in electrical response, to other discontinuities on other branches.

In a complex spectral embodiment of the type discussed above, an outgoing pulse 1-331 may be an 'envelope' containing a modulated voltage 'tone' at a certain frequency or frequency range. Instead of sampling the return pulses on leading-edge, trailing-edge or other pulse detection techniques or otherwise reconciling individual pulse returns to particular clock or detection cycles, embodiments of the complex spectral method may perform analog detection of a full or partial return spectrum.

In the embodiment depicted, each of the discontinuities reflects a modulated tone. A relatively isolated discontinuity may reflect a uniform, relatively isolated tone whereas discontinuities that are close together or otherwise similarly situated (i.e. both within a certain distance from the outgoing pulse source or likely to have reflections that overlap in time due to their relative electrical properties) may result in a combined reflection 1-341 that contains overlapping tone portions 1-351 that merge and amplify each-other in the overlapping region. Sampling or analyzing the return spectrum 1-361 of pulse reflections or modified/altered signal waveforms may then produce a particular key 1-381 based on both the characteristics of the transmission media and the particular sampling or analysis method.

Embodiments working with modulated tone transmission and detection may employ an analog to digital converter to do time domain sampling. The digital representation of the analog return may undergo any number of digital signal processing or detection schemes. The embodiment depicted may employ a digital spectral analysis, as in a Fast Fourier Transform (FFT). The spectrum resulting from the FFT transform of the time domain sampled return may then be subjected to any number of detection schemes. Embodiments of detection schemes in the frequency domain may be analogous to detection schemes in the time domain. In some embodiments, an amplitude threshold detector may be used.

In the embodiment depicted, an eight-bit key value 1-381 is populated based on the particular spectral distribution of return tones 1-361. In this embodiment, intensity at a given frequency does not affect the key value, however other embodiments may employ both spectral distribution and spectral intensity characteristics to generate key values. Yet further embodiments may use particular detected quantities or computed values such as the digitized amplitude value of the central spectral value directly as a key.

FIG. 2a depicts a block diagram of an embodiment of a hardware configuration according to the present invention. In the embodiment shown, the signal conductor 201 may be a hardware component or set of components based on whose characteristics a key is generated. In various embodiments of the present invention, a signal conductor may include a removable dongle-type device, portions of embedded wiring or printed circuit boards, or a specialized conductor or set of conductors, or a combination of any of the above. Yet further embodiments may include impedance characteristics imparted by different dielectric materials as portions of the code-storing signal conductor 201 or may include impedance characteristics of conductive components not otherwise electrically related to connected to any circuits in a system protected by an inventive embodiment. Further embodiments still may include combined electrical and optical transmission media, multiple connected or disparate transmission media, or even empty spaces as transmission media for the detection of electro-magnetic fields, temperatures, optical reflections, or ultrasonic or sonic reflections.

In some embodiments of the present invention, the signal conductor 201 may be either connected to or integrated with signal transmission 271 and/or signal detection 211 components. In the embodiment depicted, the signal conductor 201 is disposed between a signal transmitter 271 and a signal detector 211 such that transmission occurs at the start of a conduction path and detection occurs at the end of the conduction path. The embodiment shown also has a clock 221 operably connected t the signal detector 211. Alternative embodiments, such as ones employing TDR techniques, may have the signal detector and signal transmitter co-located because the end of the signal path is defined by the point at which the reflections generated by impedance discontinuities in the signal path are detected. Yet further embodiments may not employ a clock, or may have a clock operably connected to different or multiple components, or may have multiple clocks.

In the embodiment shown, the signal transmitter 271 is operably connected to an input/output (I/O) interface 251 via an access detection unit 261. Alternative embodiments may have an access detection unit integrated into the I/O or signal transmission units as either an operational sub-unit or as part of programmable or hard-wired logic.

The I/O interface 251 is operably connected to the data storage portion 241, which may include any number of readable storage media on which information may be stored in encrypted form for later recovery. In the embodiment shown, the data storage 241 comprises electronically-based data storage such as hard drives, flash memory, an EPROM chip, or RAM storage. Alternate embodiments may employ optically-based data storage such as optical discs, bar-codes, or other optically-readable information carriers. Yet further embodiments may employ more exotic storage solutions such as biologically-based storage.

Figure 2B:
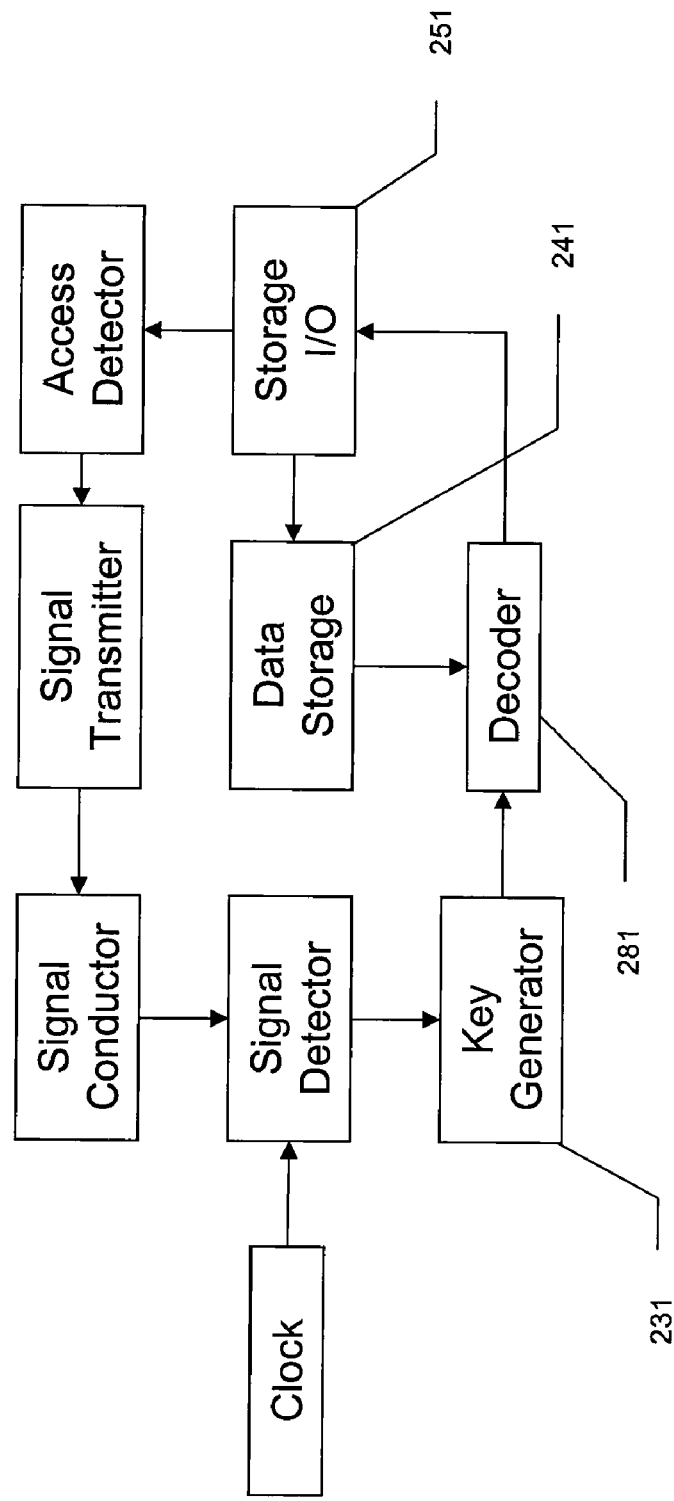
FIG. 2b shows a block diagram of an alternate embodiment of a hardware system configured for hardware-based key access according to aspects of the present invention.

The data storage 241 is operably connected to a key generator 231 that generates a key based on the signal detected by the signal detector 211. In the embodiment shown, the stored data may be provided in encrypted form along with the generated key via the I/O interface 251 in response to an access attempt. As shown in FIG. 2b, other embodiments may include a decoder portion 281 that accepts the key generated by the key generator 231 and the encrypted data from data storage 241 and decodes the data with the key. In such embodiments, decoded data only may be provided via the I/O interface 251. In some embodiments, the decoder may be an integral portion of the key generator 231 or the data storage 241. Also, in yet further embodiments, the system may be configured to output either decoded data only, decoded data and the generated key, encrypted data and the generated key, encrypted data only, or the generated key only.

Figure 2C:
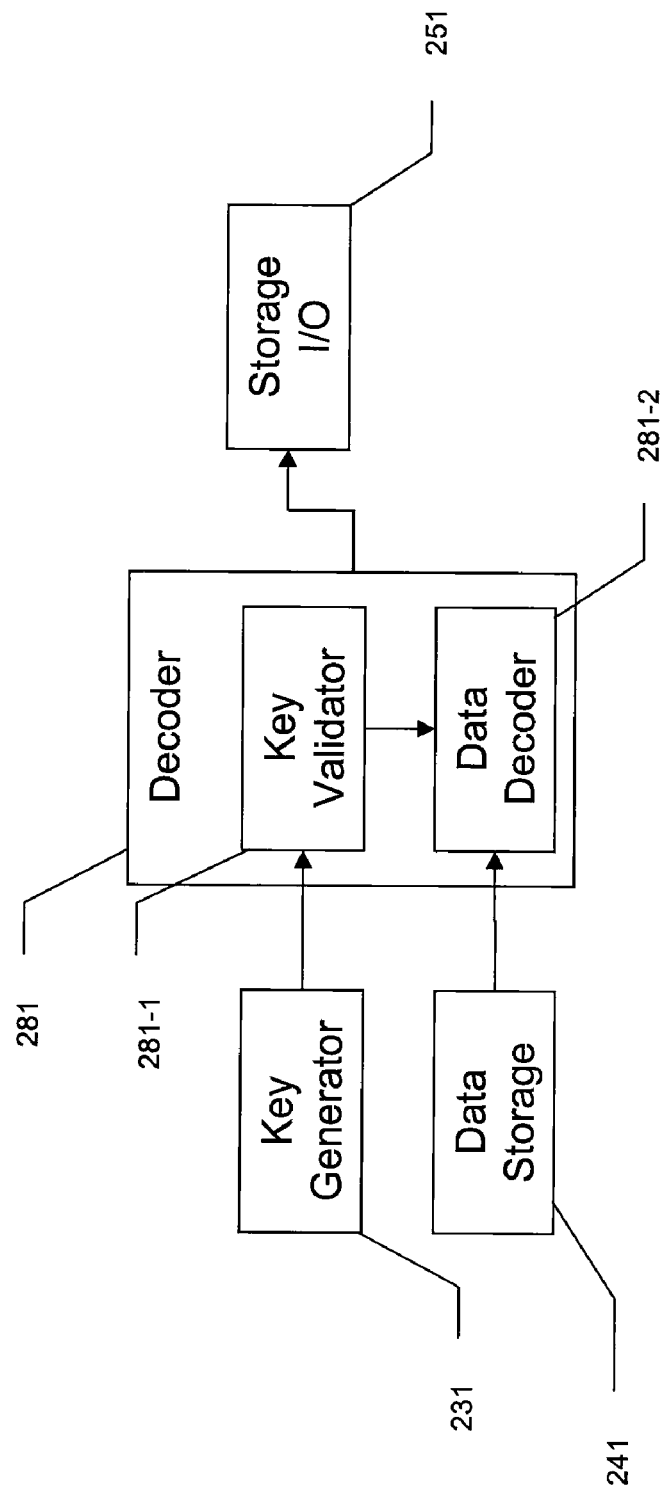
FIG. 2c shows a block diagram of an embodiment of a decoder according to aspects of the present invention.

Embodiments of a decoder 281 may, as shown in FIG. 2c, include sub-units for key validation 281-1 and data decoding 281-2. In the embodiment shown, the key validator 281-1 examines the key generated by a key generator 231 and determines if it is a valid key. The data decoder 281-2 accepts a valid key from the key validator 281-1 and uses that key to decode stored data 241. Alternative embodiments may include a key validation sub-unit or feature as part of the key generator 231. Yet further embodiments may, as part of the key validator, include a data corruption or data removal unit (not shown) that destroys or otherwise deliberately damages the stored data 241 when an invalid key is generated. Yet further embodiments may couple the key validator to various forms of physical data destruction or device destruction devices (not shown).

Figure 2D:
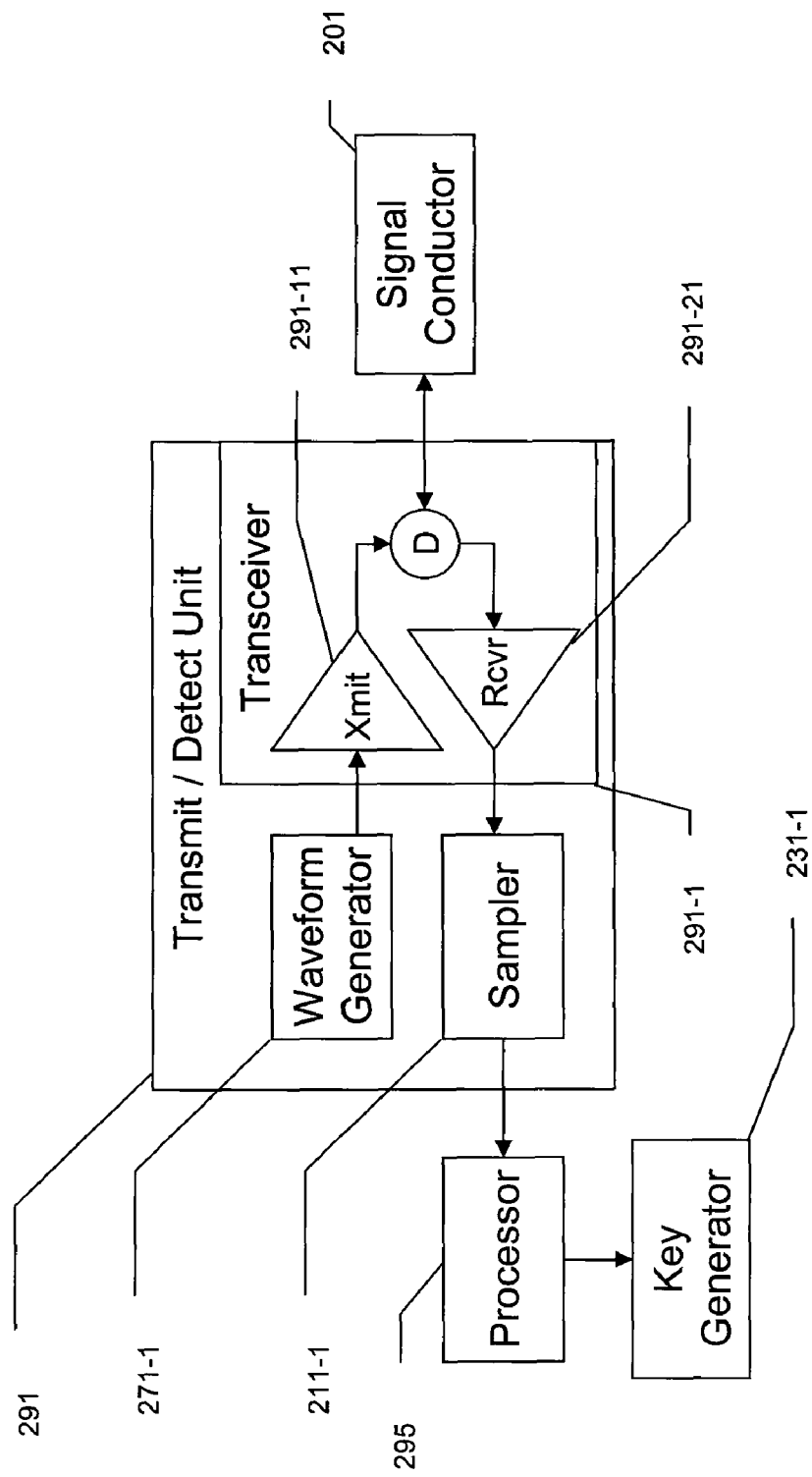
FIG. 2d shows a block diagram of embodiments of a signal detector and key generator according to aspects of the present invention.

Embodiments of a signal transmitter and signal detector coupled as a transmit/detect unit 291, as depicted in FIG. 2d, may contain a waveform generator 271-1 that may generate any number of outgoing voltage pulse waveforms, including single pulses, modulated tones, or a pulse series of predetermined type—such as one with weak pulses followed by strong pulses in a particular sequence. The depicted embodiment may be configured to use a commercial waveform generator, FPGA, ASIC, discrete logic, and/or a DSP chip as a waveform generator.

The waveform generator 271-1 is operably coupled to a transceiver portion 291-1 that actually transmits to and receives results from the signal conductor 201. Such embodiments may be employed for closed-loop signal conductors or TDR-based analysis techniques where the start and end of the analyzed conduction path are at the same physical location on the signal conductor.

One embodiment of a transmit/detect unit 291 generates a pulse or waveform transmitted through a transmission media 201 with the waveform generator 271-1 and detects a return signal with a sampler 211-1 configured for a particular detection paradigm. Embodiments of a sampler may include binary detectors, envelope detectors, and/or analog to digital converters. In some embodiments, the sampler may detect a full analog return spectrum, while in others it may be synchronized with a clock signal to detect leading or trailing edges of return pulses, or some combination thereof. Embodiments of the present invention may use oscillators, clock generator ICs, and/or phased locked loops as a clock signal generator.

A TDR embodiment of a transmit/detect unit 291 may transmit and detect a TDR pulse and, in some alternative embodiments, provide a synchronization or clock signal to enable effective key generation with a transceiver 291-1 that transmits an outgoing pulse with a transmitter portion 291-11 and, after a predetermined delay, switches into reception mode and begins receiving reflected pulses from the signal conductor 201 via its receiver portion 291-21. Embodiments of such a transceiver may include ASICs, TDR chips, discrete circuits, and/or communication ICs. In some embodiments, the transceiver may also generate its own clock signal.

In a TDR embodiment, signal reflections detected by the receiver portion 291-21 may then be passed from the receiver portion 231-20 to the sampler 211-1 for analysis as discussed above. In alternative embodiments, the receiver portion 291-21 of the transceiver may have an integrated sampler sub-unit. In further embodiment still, the waveform generator 271-1 may have an integrated transmitter and the sampler 211-1 may have an integrated receiver, eliminating the need for a transceiver device.

Embodiments of a signal detector 211 or a transmit/detect module 291 may be operably or physically coupled to a processor 295 that may convert the sampled or detected results into a numerical value. In some embodiments, a processor may provide an intermediate signal processing step that converts a received or sampled signal into a numerical value or set of numerical values. In alternative embodiments, a sampler 211-1 or signal detector 211 may include an integrated processor (not shown) or other device allowing it to directly generate numerical values based on sampled or detected results. In further embodiments still, the output of the sampler 211-1 or signal detector 211 may be used directly for key generation without requiring an intermediate processing step.

Alternate inventive embodiments may also have other test and detection units coupled to a processor 295 or to other, different or additional processors for the generation of additional numerical values based on other detected physical parameters such as ambient temperature, ultrasonic echoes, light reflections, and any other discernible and testable physical property of a hardware unit. In some embodiments, transmitters such as lasers, infra-red light sources, ultrasonic generators, or other signal sources may be couples with appropriate detectors such as photo diodes, microphones, or thermocouples. The processor or processors associated with a particular embodiment may execute time or frequency analysis on the sampled or detected results, or may simply count the number of return pulses detected, or perform yet other signal processing or signal analysis functions to develop a numerical value or set of numerical values representing a return signal.

An embodiment of a key generation system according to the present invention may have a key generator 231-1 operably or physically coupled to the processor 295. The key generator 231-1 may be used to generate a key or set of keys from the numerical value or numerical values generated by the processing device 295. The key generator 231-1 may employ a wide range of key generation algorithms or paradigms depending on the specific requirements of the information being protected by the inventive system. Symmetrical or asymmetrical authentication or encryption keys may be generated, as well as particular sequences or signals required for full device activation, may be generated by different embodiments of a key generation unit. In various embodiments of the invention, key generation may be performed in response to an access request or access attempt, or may be a periodic security measure performed to ensure that the protected system has not been tampered with.

In embodiments of the inventive system, key generation may be accomplished using lookup tables and numerical hashing functions, or may be more complicated depending on the output of the processing unit 295 or processing units (depending on the particular embodiment) or, in some embodiments, direct output from a sampler 211-1 or a signal detector 211.

In some embodiments of a system as described above, there may be a cryptographic unit, such as the decoder 281 of FIG. 2c, either residing in an embodiment of the tested hardware or otherwise connected to an embodiment of an inventive system may accept the key generated by the key generation unit 231 and use it for either data decryption, in the case of a decoder 281, or access authentication purposes. Embodiments of cryptographic units may be implemented in hardware, software, or a combination thereof, and may include any suitable cryptographic hardware or applications configured to accept key data from the key generator 231.

Alternate embodiments of the present invention may have multiple cryptographic applications in one cryptographic unit, or several may have multiple cryptographic units, or may instead have sequence checks that simply prevent further system function in the event an incorrect key is delivered to them. Yet further embodiments may have cryptographic applications or sequence checks that accept input from multiple key generators. Embodiments of particular types of cryptographic unit may depend on the type and length of key generated by the key generator. The key generator 231 and cryptographic unit 281 may be part of an integrated system or otherwise connected to the rest of the inventive system directly, or may be part of a separate system that is configured to exchange information with embodiments of signal generation and detection hardware through various communication methods such as infra-red, radio-frequency, or dedicated communication lines.

Embodiments of the present invention may be configured such that processing 295 and key generation 231, 231-1 units generate and transmit key or key-related information in a single operation, thereby removing any need to store key information which is not currently being used. Such embodiments may provide the additional security of removing any generated key information from the inventive system while it is in an inactive state, thereby frustrating efforts at key duplication or decryption.

Yet further embodiments of the present invention may combine multiple transmission or detection units 271, 211, 291 coupled to either the same or different transmission media 201, or may include other physical characteristic determination devices such as thermometers, optical test devices, or ultra-sonic test devices. Optical embodiments may include conduction paths partially composed of empty space and/or reflective or refractive elements. Sonic or ultrasonic embodiments may also include conduction pathways partially composed of empty space and/or sonically reflective elements.

In some embodiments, the various outputs of the multiple test devices may be combined into a single processing unit or, in yet further embodiments, may be processed by separate processing units that then feed a common key generator or have either their input or output data subjected to various forms of multiplexing for processing through common or shared components.

Further embodiments still may generate separate keys from each test device and have additional components that combine the key data or otherwise coordinate how the various keys are to be used. Further embodiments may include self-destruct devices connected to a cryptographic application or a sequence check device such that an incorrect key or code may trigger an embodiment of a device according to the present invention to lose data or components or otherwise become permanently damaged or altered.

FIG. 3a depicts an embodiment of a test, key generation, and access authentication process according to the present invention. On an initial access attempt 301 to access key secured data, the system storing the data issues a key request 350 that triggers a pulse transmission 320. The result of the pulse transmission is detected 310 and subsequently used to generate an access key 360. Other embodiments of the present invention may omit or add steps to this basic process. Alternative embodiments may include go/no-go activation variants or data decryption paradigms based on the generated key information. In some embodiments, the key request may be an inherent portion of the access attempt detection step. In yet further embodiments, pulse detection and key generation may be portions of the same processing step.

Figure 3B:
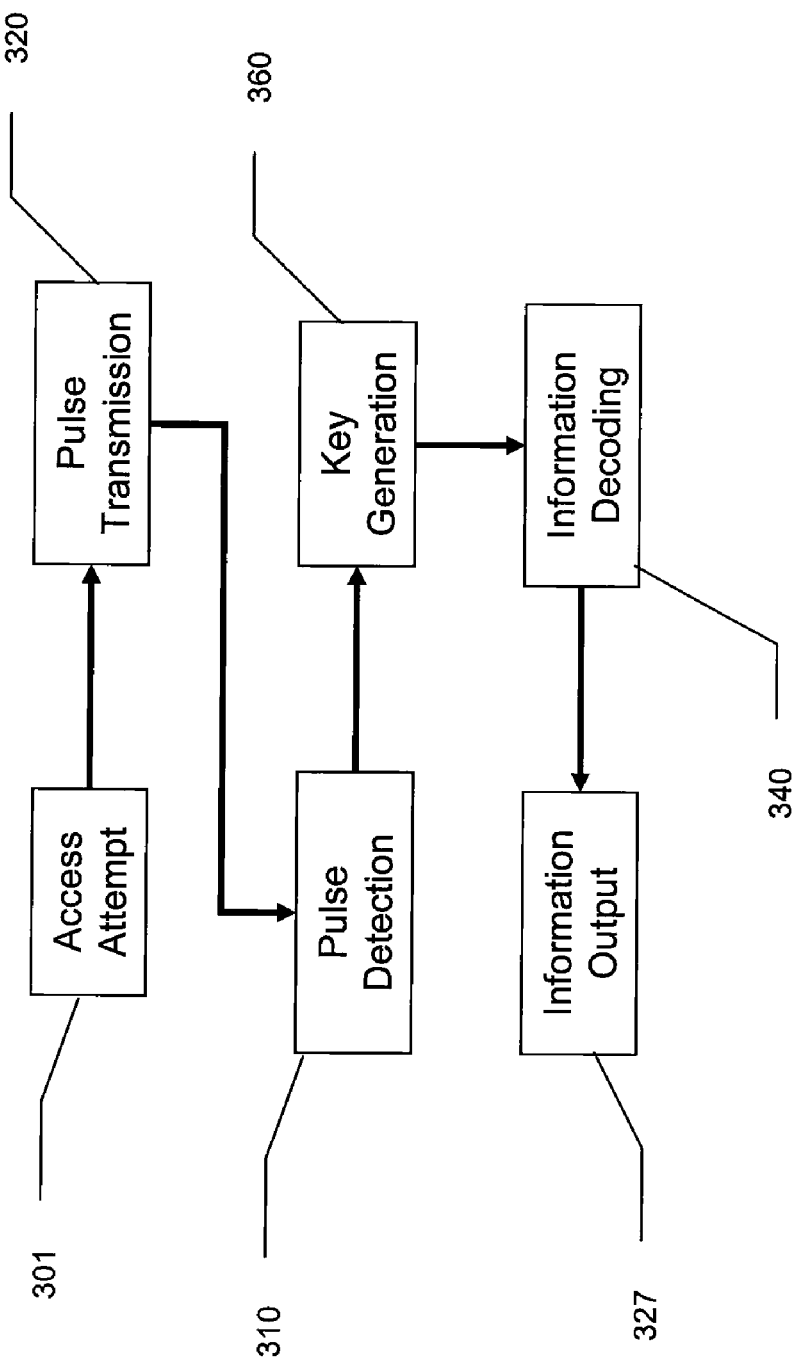
FIG. 3b. shows a block diagram of an embodiment of a hardware-based key generation and data decoding process according to aspects of the present invention.

FIG. 3b depicts an embodiment of a test, key generation, decoding, and data output process according to the present invention. In such an embodiment an access attempt 301 may inherently contain a key request that triggers a pulse or waveform transmission 320. Alternate embodiments may be configured to implicitly understand any access attempt 301 as a key request.

Upon detection of a return or reflected (in the case of TDR-based embodiments) pulse or waveform 310, a key may be generated 360 either directly from the detected signal or from results of an intermediate processing operation or sequence of operations (not shown) that convert the detected signal into a usable or suitable numerical form. The generated key may then be used for information decoding operations 340 that decode encrypted or encoded information such that they may be output 327 in response to the access attempt 301.

In some embodiments of a data decryption and output process, the generated key is not subjected to validation or verification. In such an embodiment, any attempt to access the protected data triggers a signal transmission/detection and key generation sequence. The generated key may then be used in a decryption or decoding process that may be hardcoded directly into the data read or I/O hardware or embedded in memory or device driver software. In such an embodiment, a system protected with the inventive concept may always output decrypted data, but if the generated key data is incorrect, the results of the decryption or decoding may be anything from garbled or junk data to deliberately incorrect or misleading information, depending on the particular decryption routines and methods being employed.

Figure 3C:
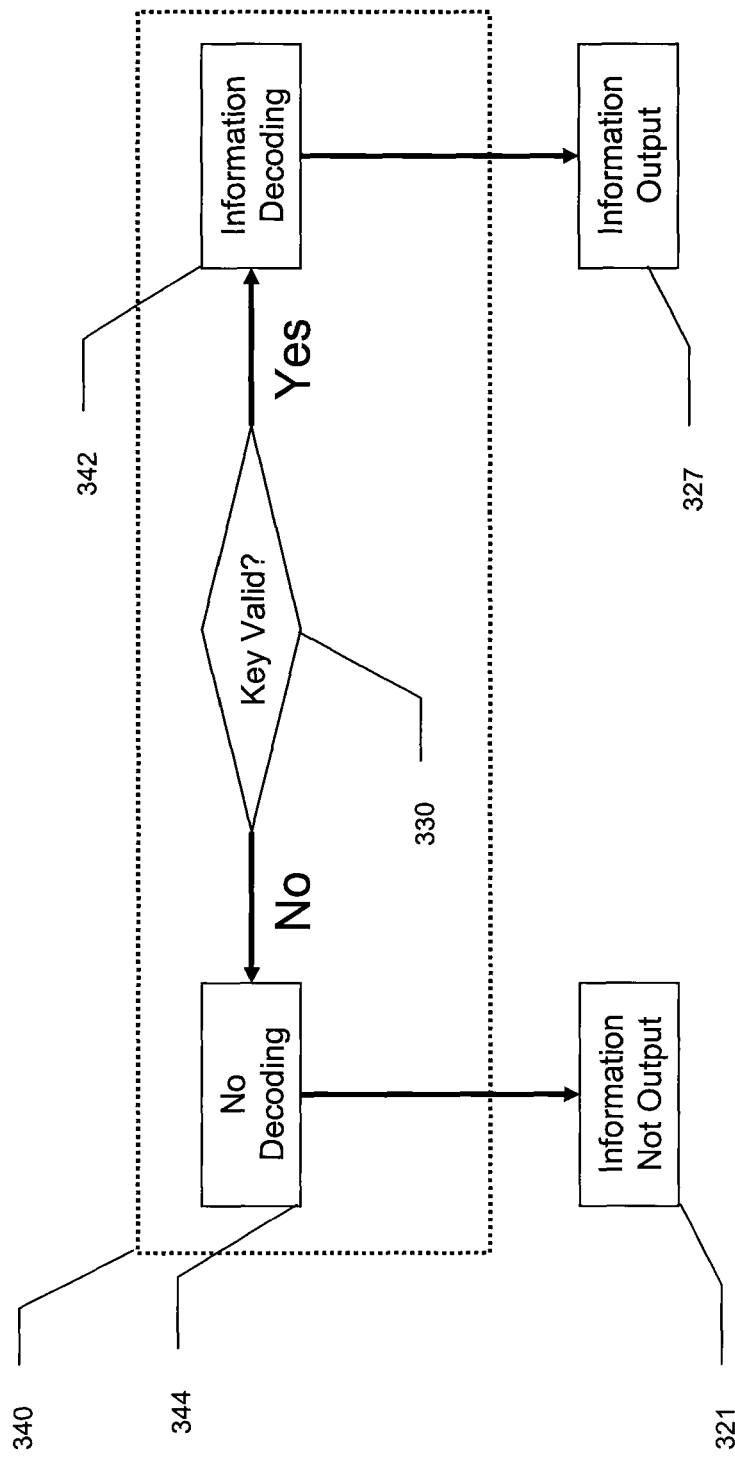
FIG. 3c. shows a block diagram of an embodiment of a hardware-based key validation process according to aspects of the present invention.

Alternate embodiments of the present invention may employ go/no-go activation sequence or access sequence methods similar to that depicted in FIG. 3c. In the embodiment shown, the information decoding step 340 may include a key validation sub-process 330. If the key is determined to be valid, the information is decoded 342 and output 327 in response to an access request. If the key is determined to be invalid, information is not decoded 344 and nothing is output 321. Alternate embodiments may include routines that damage or destroy information or components of a device protected by an embodiment of hardware-based encoding according to the present invention. Yet further embodiments may deliberately output incorrect information or may be configured to attempt destructive or disabling operations on any device attempting to access the encoded information.

Further embodiments may have hardware or software components that require generated key information to activate certain hardware components such as drive heads or memory registers or power management devices, thereby causing seemingly unrelated portions of devices protected with a hardware-based encoding method according to the present invention to become inoperable or inaccessible as a result of tampering or duplication attempts. Further embodiments of the present invention may combine physical security and information segregation security protocols such that a hardware-based go/no-go activation sequence embedded in a system according to the present invention may be designed for one-time user configuration or initialization in a deployment environment, thereby permitting the inventive devices to be fabricated or inventive methods to be promulgated without compromising or centralizing information related to the actual data or device securing parameters.

Yet further embodiments of the present invention may be designed for installation into general-purpose computing devices or other commercially available data storage and processing devices, thereby securing them from hardware modification or tampering. Embodiments of the present invention may be particularly directed at performing analysis or testing on output ports of protected devices, such that the protected device will not operate properly if particular hardware is missing from or connected to it.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

We claim:

1. A method of recovering encoded information stored in a data storage device having at least one signal conductor with predetermined transmission characteristics, an encoded information storage portion having at least one input/output (i/o) interface, and a system clock, the method comprising:

detecting a data access attempt that attempts to read at least a portion of encoded information stored in said encoded information storage portion via said i/o interface;

transmitting, in response to said detecting, at least one pulse along the at least one signal conductor, where said pulse is provided to said signal conductor at a pulse transmission location of said conductor;

detecting transmission characteristics of the at least one signal conductor based on said transmitted pulse, where said pulse is detected at a pulse detection location of said conductor, a return signal propagated along said conductor as a result of said pulse transmission; and generating a decoding key based on the detected transmission characteristics depending upon both of the pulse transmission location and the pulse detection location that define a signal path along the conductor.

2. The method of claim 1, further comprising:
decoding said at least a portion of encoded information using said decoding key; and
providing the decoded information via said i/o interface in response to the data access attempt.

3. The method of claim 2, where decoding includes:
determining whether the generated decoding key is a correct decoding key; and
decoding said encoded information only if the generated decoding key is correct.

4. The method of claim 3, decoding said encoded information including corrupting or destroying said encoded information if the generated decoding key is incorrect.

5. The method of claim 1, where transmitting includes transmitting at least one electrical voltage pulse.

6. The method of claim 5, where said at least one voltage pulse is a uniform pulse.

7. The method of claim 5, where said at least one voltage pulse includes at least a first and a second voltage pulse and where said first and second voltage pulses have different intensities and/or different widths.

8. The method of claim 5, where said at least one voltage pulse includes at least a first, second, and third voltage pulse and where an interval between the first and second pulses is different than an interval between the second and third pulses.

9. The method of claim 5, where said detecting transmission characteristics includes detecting the voltage of said pulse.

10. The method of claim 1, the method further comprising:
providing the decoding key and the encoded information via said i/o interface in response to the data access attempt.

11. The method of claim 1, where said pulse includes an enveloped voltage pulse waveform having a modulated voltage tone.

12. The method of claim 11, where detecting transmission characteristics includes performing spectral analysis on a return signal created by said enveloped voltage pulse.

13. The method of claim 1, where said transmission characteristics are both predetermined and detected based on time-domain reflectometry techniques.

14. The method of claim 13, where said detecting transmission characteristics includes detecting a leading edge of a reflection of said pulse.

15. The method of claim 13, where detecting transmission characteristics includes converting a sampled time-domain reflectometry reception signal into at least one numerical value.

16. The method of claim 1, where said transmission characteristics are both predetermined and detected based on a pulse travel time between said pulse transmission location and said detection location.

17. The method of claim 16, where said detecting transmission characteristics includes detecting the pulse travel time.

18. The method of claim 16, where a width of a detected pulse and the pulse travel time are detected transmission characteristic used in key generation.

19. The method of claim 1, where said transmission characteristics are both predetermined and detected based on counting a predetermined number of clock cycles after said transmitting and detecting transmission characteristics for said number of clock cycles.

20. The method of claim 19, where detecting transmission characteristics includes sampling a return signal caused by said transmitted pulse such that each clock cycle is associated with a sampled signal value.

21. The method of claim 20, where said sampling a return signal includes associating a first value with each clock cycle where at least one leading edge of a return signal associated with said at least one pulse is detected and associating a second value with each clock cycle where no leading edge of said return signal is detected.

22. The method of claim 19, where generating a decoding key includes generating a decoding key based on the number of clock cycles and on the transmission characteristics detected at each clock cycle.

23. The method of claim 22, where generating includes:
creating a binary number with a number of bits equal to the number of clock cycles such that each bit is associated with a particular clock cycle; and
assigning a value to each bit based on the transmission characteristics detected at the clock cycle associated with a particular bit.

24. The method of claim 1, where said detecting transmission characteristics includes detecting a leading edge of said pulse.

25. The method of claim 1, where said transmission characteristics include characteristics that indicate the total length of said conductor.

26. The method of claim 1, said generating including symmetrically generating a decoding key.

27. The method of claim 1, said generating including asymmetrically generating a decoding key.

28. An apparatus that recovers encoded information stored in a data storage device, the apparatus comprising:
at least one signal conductor with predetermined transmission characteristics;
an encoded information storage portion having at least one input/output (i/o) interface;
a system clock;
an access detection portion that detects an attempt to read at least a portion of encoded information stored in said encoded information storage portion;
a transmitter that transmits, at a pulse transmission location, at least one pulse along said at least one signal conductor;
a detector that determines transmission characteristics of said at least one signal conductor by detecting, at a pulse detection location, a return signal propagated along said conductor as a result of said pulse transmission; and
a key generator that generates a decoding key based on the detected transmission characteristics depending upon both of the pulse transmission location and the pulse detection location that define a signal path along the conductor.

29. The apparatus of claim 28, where the transmitter is an electrical pulse transmitter and the detector is an electrical signal detector.

30. The apparatus of claim 29, where the transmitter is a voltage pulse generator and the detector is a sampling detector.

31. The apparatus of claim 30, where the signal conductor includes a closed loop.

32. The apparatus of claim 29, where the transmitter and detector are part of a time-domain reflectometry measurement device.

33. The apparatus of claim 30, where the signal conductor includes multiple termination points.

34. The apparatus of claim 30, where the signal conductor has a single termination point.

35. The apparatus of claim 30, where the signal conductor has a non-uniform composition.

36. The apparatus of claim 35, where said non-uniform composition includes impedance discontinuities caused by at least one of changes in material composition of the conductor over its length, the presence or absence of a dielectric substrate below the conductor, and the presence of an electrical element along the conductor.

37. The apparatus of claim 30, where the signal conductor includes electrical elements in its conduction path.

38. The apparatus of claim 28, where the transmission location and detection location are the same physical location on the conductor.

39. The apparatus of claim 28, where the transmitter is an optical pulse transmitter and the detector is an optical detector.

40. The apparatus of claim 39, where the signal conductor includes a closed loop.

41. The apparatus of claim 39, where the signal conductor includes multiple termination points.

42. The apparatus of claim 39, where the signal conductor has a single termination point.

43. The apparatus of claim 39, where the signal conductor has a non-uniform composition.

44. The apparatus of claim 43, where the signal conductor includes empty space and optically reflective elements.

45. The apparatus of claim 39, where the signal conductor includes optical elements in its conduction path.

46. The apparatus of claim 28, the apparatus further comprising:
  a decoder that decodes said at least a portion of encoded information using said decoding key and provides the decoded information via said i/o interface in response to the data access attempt.

47. The apparatus of claim 46, where the decoder includes:
  a key validation sub-unit that determines whether the generated decoding key is a correct decoding key; and
  a decoding sub-unit that decodes said encoded information if the generated decoding key is correct.

48. The apparatus of claim 28, where the transmitter is an ultrasonic transmitter and the detector is an ultrasonic detector.

49. The apparatus of claim 28, where the transmission characteristics are both predetermined and detected based on a pulse travel time along the signal path.

50. The apparatus of claim 28, where the transmission characteristics include characteristics that indicate the total length of said conductor.

* * * * *